United States Patent
Kanoyadani et al.

(10) Patent No.: US 8,373,374 B2
(45) Date of Patent: Feb. 12, 2013

(54) APPARATUS EQUIPPED WITH MOTOR AND DRIVING METHOD FOR THE MOTOR

(75) Inventors: Ryoji Kanoyadani, Yokohama (JP); Hideyuki Kido, Isehara (JP); Tomofumi Nishida, Yokohama (JP); Nobutsune Kobayashi, Kawasaki (JP); Shinichi Yukiura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 185 days.

(21) Appl. No.: 12/848,846

(22) Filed: Aug. 2, 2010

(65) Prior Publication Data

US 2011/0031923 A1 Feb. 10, 2011

(30) Foreign Application Priority Data

Aug. 5, 2009 (JP) ................................. 2009-182891

(51) Int. Cl.
*G05B 5/00* (2006.01)
(52) U.S. Cl. ........ 318/466; 318/685; 318/696; 400/624; 400/582; 400/568; 347/16; 347/37; 347/104; 399/18; 358/448; 358/474
(58) Field of Classification Search .................. 318/466, 318/685, 696; 400/624, 582, 568; 347/16, 347/37, 104; 358/448, 474; 399/18
See application file for complete search history.

(56) References Cited

U.S. PATENT DOCUMENTS

| | | | | |
|---|---|---|---|---|
| 2006/0222432 | A1* | 10/2006 | Terada | 400/624 |
| 2007/0241717 | A1* | 10/2007 | Shibasaki et al. | 318/685 |
| 2007/0267996 | A1* | 11/2007 | Shibasaki et al. | 318/696 |
| 2008/0050165 | A1* | 2/2008 | Saito et al. | 400/582 |

FOREIGN PATENT DOCUMENTS

| | | | |
|---|---|---|---|
| JP | 2001-099850 A | | 4/2001 |
| JP | 2001099850 A | * | 4/2001 |

* cited by examiner

*Primary Examiner* — Lincoln Donovan
*Assistant Examiner* — Jorge Carrasquillo
(74) *Attorney, Agent, or Firm* — Canon USA, Inc., I.P. Division

(57) ABSTRACT

An apparatus including a DC motor includes a driven member configured to be driven by the DC motor, and a drive control unit configured to define a plurality of predetermined phases of the DC motor as target stop phases and to cause the DC motor to make at least one rotation to perform preliminary driving that rotates the DC motor to each target stop phase by driving and stopping the DC motor, configured to acquire a difference value between the target stop phase and an actual stop phase for each target stop phase, and configured to drive the DC motor so that the driven member is repeatedly moved and stopped in the operation of the driven member and to perform control so that, based on the difference value acquired by the acquisition unit, electric power is supplied to the DC motor in a phase corresponding to a stop position of the driven member.

7 Claims, 10 Drawing Sheets

APPARATUS EQUIPPED WITH MOTOR AND DRIVING METHOD FOR THE MOTOR

BACKGROUND OF THE INVENTION

1. Field of the Invention

The present invention relates to an apparatus equipped with a motor and a driving method for the motor, and in particular, relates to driving of a direct current (DC) motor as a driving source.

2. Description of the Related Art

Apparatuses equipped with a motor include, for example, an image reading apparatus (scanner), recording apparatus (printer), and multifunction peripheral having a reading function and a recording function. Such apparatuses suppress working sound by using a DC motor.

An image reading apparatus (scanner) is required to provide high read resolution, as well as suppression of working sound. On the other hand, such a scanner executes a mode of reading in low resolution of, for example, 75 dots per inch (dpi) and also a mode of reading in high resolution like 9600 dpi. To handle such a wide range of resolution, it is necessary for a motor that moves a carriage to be provided for traveling speeds from a low speed to a high speed.

If a scanner in which a carriage whose driving source is a DC motor is operated should realize constant low-speed movement to implement high-resolution reading as described above, feedback control needs to be performed in a control period appropriate for a mechanism unit thereof. For this purpose, it is necessary to know the position of the carriage with high precision, which requires a high-resolution encoder. Thus, if the carriage is moved at a low speed, a signal of the encoder changes less when compared with a case of a high speed so that speed fluctuations due to an influence of cogging or the like cannot be suppressed. If the carriage speed is faster than a time necessary to read pixels of one line (hereinafter, referred to as one read line) due to the speed fluctuations, the carriage will pass through the line and move to the next read line even though the line to be read has not been read. This results in line shifts in an output image. Similarly, if the carriage speed is slower than the time necessary to read one read line, an overflow of read data occurs due to overexposure or dark current noise increases due to delayed lights-out of a light source of a read sensor. This results in degraded quality of an output image.

To avoid the above issues, the DC motor needs to be controlled by an encoder of resolution appropriate for reading a document in read resolution. Particularly when images are read in various resolutions and the range of resolution is wide, it is necessary to devise some contrivance to handle such a situation.

In the past, for example, like Japanese Patent Application Laid-Open No. 2001-99850, providing a high-resolution encoder for low speed, in addition to an encoder (high-speed encoder) held by a conventional scanner, to use the two encoders for different purposes has been discussed to realize such contrivance.

When mounting a DC motor equipped with a high-resolution encoder to read a document in high resolution, apparatuses on which such a DC motor can be mounted are limited due to factors such as the physical size thereof and cost. This also applies to the method discussed in Japanese Patent Application Laid-Open No. 2001-99850 and it is difficult to mount such a DC motor on a low-priced small-sized image processing apparatus.

For the above reason, there are many cases where only encoders having resolution that is insufficient to satisfy specification requirements thereof can be mounted on image processing apparatuses. Thus, even if an attempt is made to move the carriage at a constant low speed, precise speed information cannot be acquired so that speed fluctuations of the carriage cannot be followed. This results in lower quality of an output image such as pixel shifts and is a factor that prevents mounting of a DC motor on an image processing apparatus that supports reading of a high-resolution image.

To deal with this issue, performing control so that a step movement is made for reading by stopping after a speed servo for one read line being performed when a document image is read in high resolution is assumed, instead of moving the carriage at a constant speed throughout the entire region of an image. That is, control that enables driving with less amount of rotation each time a DC motor is driven is assumed.

However, when the above control is performed, a phenomenon in which the motor stops less precisely due to torque fluctuations mainly caused by the DC motor occurs. This is a phenomenon (hereinafter, referred to as swing-back) in which the stop position shifts forward while the motor stops after the end of a servo region. If the amount of shift (hereinafter, referred to as an overrun) between the target stop position and the actual stop position is significant, the precision with which an operation or processing is performed by an apparatus cannot be improved.

SUMMARY OF THE INVENTION

The present invention is directed to an apparatus that drives a DC motor with high precision and a driving method thereof.

According to an aspect of the present invention, an apparatus including a DC motor includes a driven member configured to be driven by the DC motor, and a drive control unit configured to define a plurality of predetermined phases of the DC motor as target stop phases and to cause the DC motor to make at least one rotation to perform preliminary driving that rotates the DC motor to each target stop phase by driving and stopping the DC motor, configured to acquire a difference value between the target stop phase and an actual stop phase for each target stop phase, and configured to drive the DC motor so that the driven member is repeatedly moved and stopped in the operation of the driven member and to perform control so that, based on the difference value acquired by the acquisition unit, electric power is supplied to the DC motor in a phase corresponding to a stop position of the driven member.

According to another aspect of the present invention, a driving method for a DC motor configured to drive a driven member includes defining a plurality of predetermined phases of the DC motor as target stop phases and causing the DC motor to make at least one rotation before an operation of the driven member to perform preliminary driving that rotates the DC motor to each target stop phase by driving and stopping the DC motor, acquiring a difference value between the target stop phase and an actual stop phase for each target stop phase, and driving the DC motor so that the driven member is repeatedly moved and stopped in the operation of the driven member and performing control so that, based on the acquired difference value, electric power is supplied to the DC motor in a phase corresponding to a stop position of the driven member.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
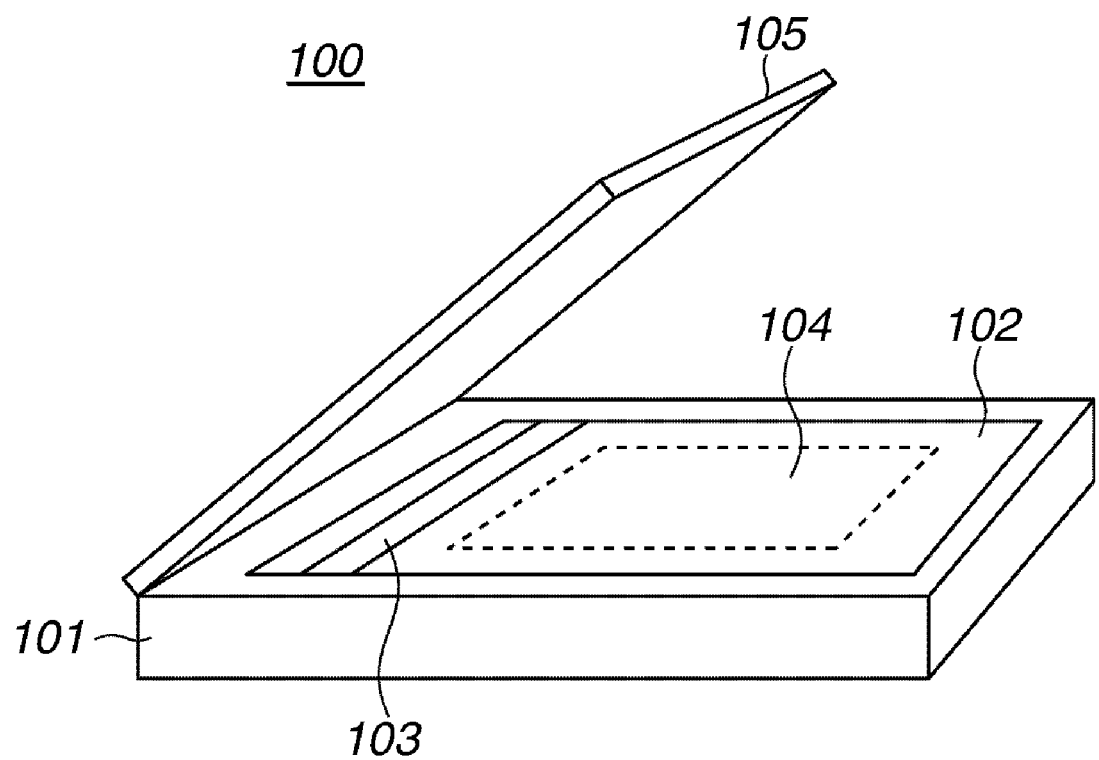
FIG. 1 is an external perspective view of an image reading apparatus according to an exemplary embodiment of the present invention.

FIG. 1 is an external perspective view of an image reading apparatus according to an exemplary embodiment of the present invention. As illustrated in FIG. 1, an image reading apparatus 100 includes a housing 101 having a control circuit and the like mounted therein, a document positioning plate 102, a carriage 103, and a document cover 105.

Figure 2:
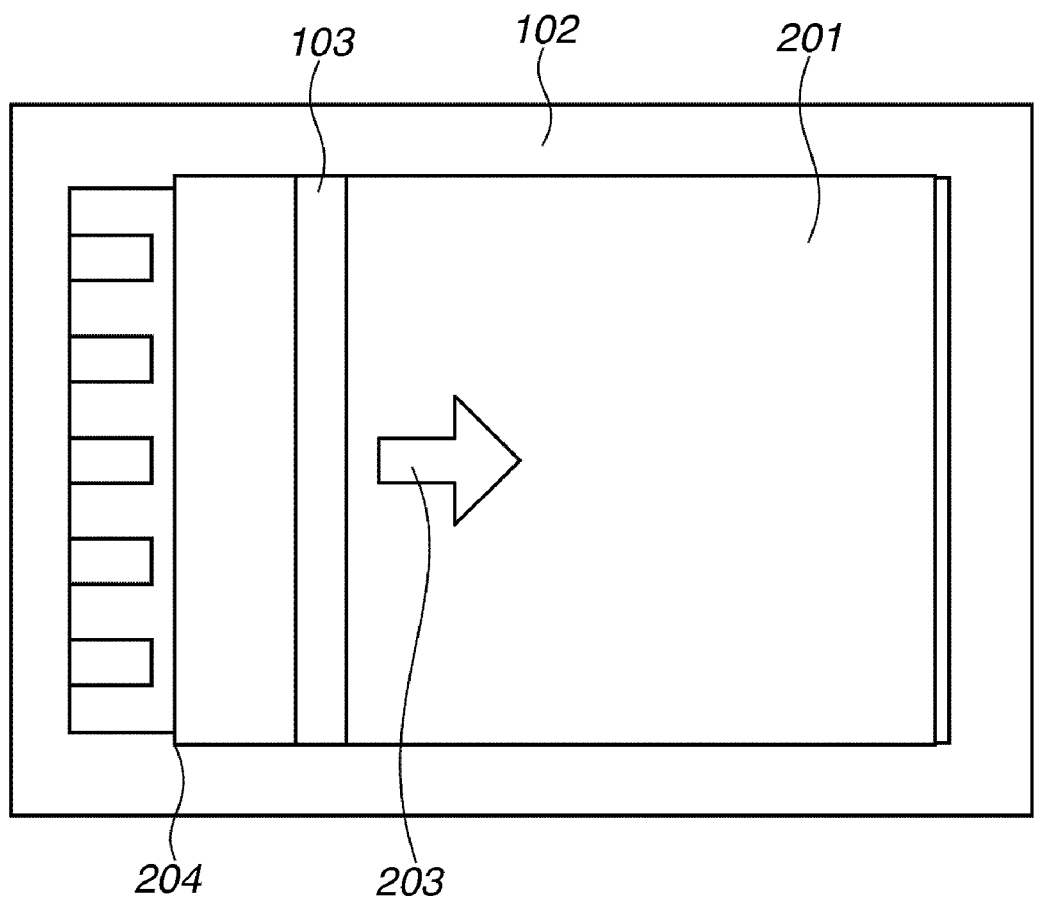
FIG. 2 is a top view of the image reading apparatus illustrated in FIG. 1.

FIG. 2 is a top view of the image reading apparatus 100 illustrated in FIG. 1. FIG. 2 illustrates how the inside of the housing 101 looks like through a glass surface 201 of the document positioning plate 102 after the document cover 105 being opened. When an image is read, a user opens the document cover 105, places a document 104 on the glass surface 201 of the document positioning plate 102, and then starts scan by the carriage 103 to read the image. As illustrated in FIG. 2, a home position 204 of the carriage 103 is located on the left side of the document positioning plate 102 and an image is read while moving the carriage 103 in a direction (main scanning direction) of an arrow 203.

The image reading apparatus 100 illustrated in FIGS. 1 and 2 is connected to a host computer (not illustrated) via an interface, for example, universal serial bus (USB), performs image reading according to instructions from the host computer, and outputs the read data to the host computer. While the image reading apparatus 100 is illustrated as a single flatbed-type apparatus in FIGS. 1 and 2, the image reading apparatus 100 may be configured as a scanner unit incorporated in a multifunction peripheral (MFP).

Figure 3:
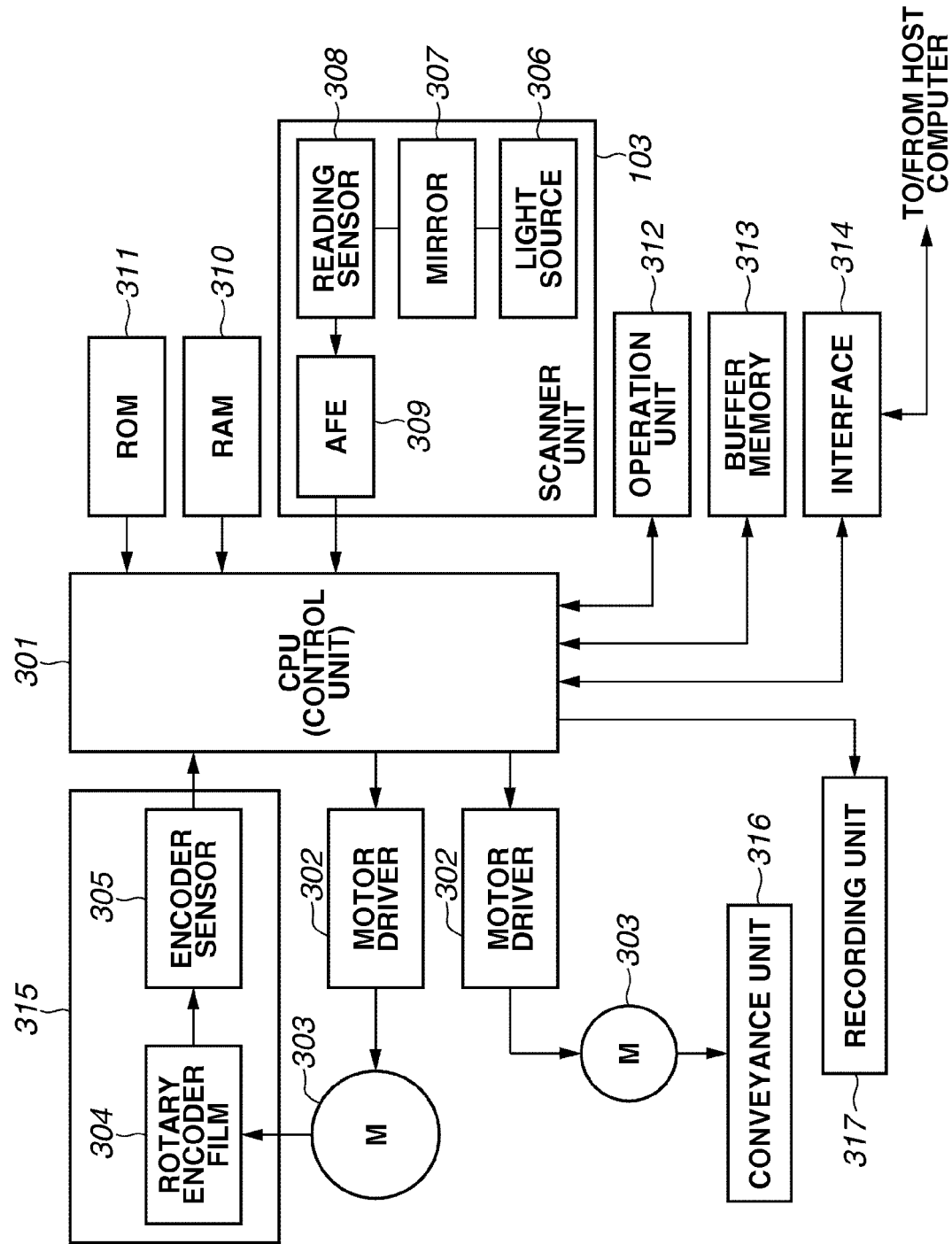
FIG. 3 is a block diagram illustrating a control configuration of the image reading apparatus.

FIG. 3 is a block diagram illustrating a control configuration of the image reading apparatus. A central processing unit (CPU) (control unit) 301 controls the whole apparatus by executing a control program stored in a read-only memory (ROM) 311 in a work area of a random access memory (RAM) 310. Control set values and parameters are also stored in the ROM 311. The RAM 310 is used, in addition to being used as a work area for execution of the control program by the CPU 301, for storing set values registered by the user and management data of the apparatus. Moreover, output values and parameters to be retained in processing described below are also stored in the RAM 310.

When the CPU 301 receives a document reading start instruction from the host computer, a reading operation of an image is started. When the reading operation is started, a light source 306 included in the carriage 103 lights up and a DC motor 303, which acts as a driving source for the carriage 103, rotates, so that a document is illuminated while the carriage 103 is moved. A light-emitting diode (LED) is used as the light source 306.

Reflected light from the document is incident on a reading sensor 308 via a mirror 307. The reading sensor 308 includes a photoelectric conversion element, such as a charge-coupled device (CCD) or a contact image sensor (CIS). The reading sensor 308 makes photoelectric conversion of reflected light or transmitted light from the illuminated document with an analog front end (AFE) 309. As a result, the obtained analog electric signal (image signal) is transmitted to the CPU 301 for analog to digital (A/D) conversion and then, image processing (such as binarization and halftone processing) preset in the ROM 311 is performed thereon. Image data obtained in this manner is stored in the RAM 310. Such image reading processing is controlled by a scan control task program stored in the ROM 311 being executed by the CPU 301.

The carriage 103 is moved by a control program stored in the ROM 311 being executed by the CPU 301 to perform feedback control so that the DC motor 303 is driven via a motor driver 302. A detection unit 315 includes an encoder sensor 305 and a rotary encoder film 304. The encoder sensor 305 is mounted on the DC motor 303 to acquire speed information by reading the rotary encoder film 304. Based on the speed information, the CPU 301 performs feedback control for driving the carriage 103.

In the present exemplary embodiment, the resolution of slits of the rotary encoder film 304 provided in the DC motor 303 is higher than that of lines read by the image reading apparatus 100. However, the number of slits corresponding to a moving distance for one line is not sufficient to enable acceleration control, constant-speed control, or deceleration control.

An operation unit 312 includes various input keys and LED lamps and allows the user to perform various operations. A buffer memory 313 is used as a data buffer for performing communication with the host computer via an interface or as an area where image data generated by reading an image is temporarily stored. An interface 314, which performs communication control conforming to a protocol such as Institute of Electrical and Electronics Engineers (IEEE) 802.3, in addition to the USB standard, performs communication control with the host computer. Moreover, data packets can be received or transmitted via the interface 314 according to a protocol such as Transmission Control Protocol/Internet Protocol (TCP/IP).

Figure 4:
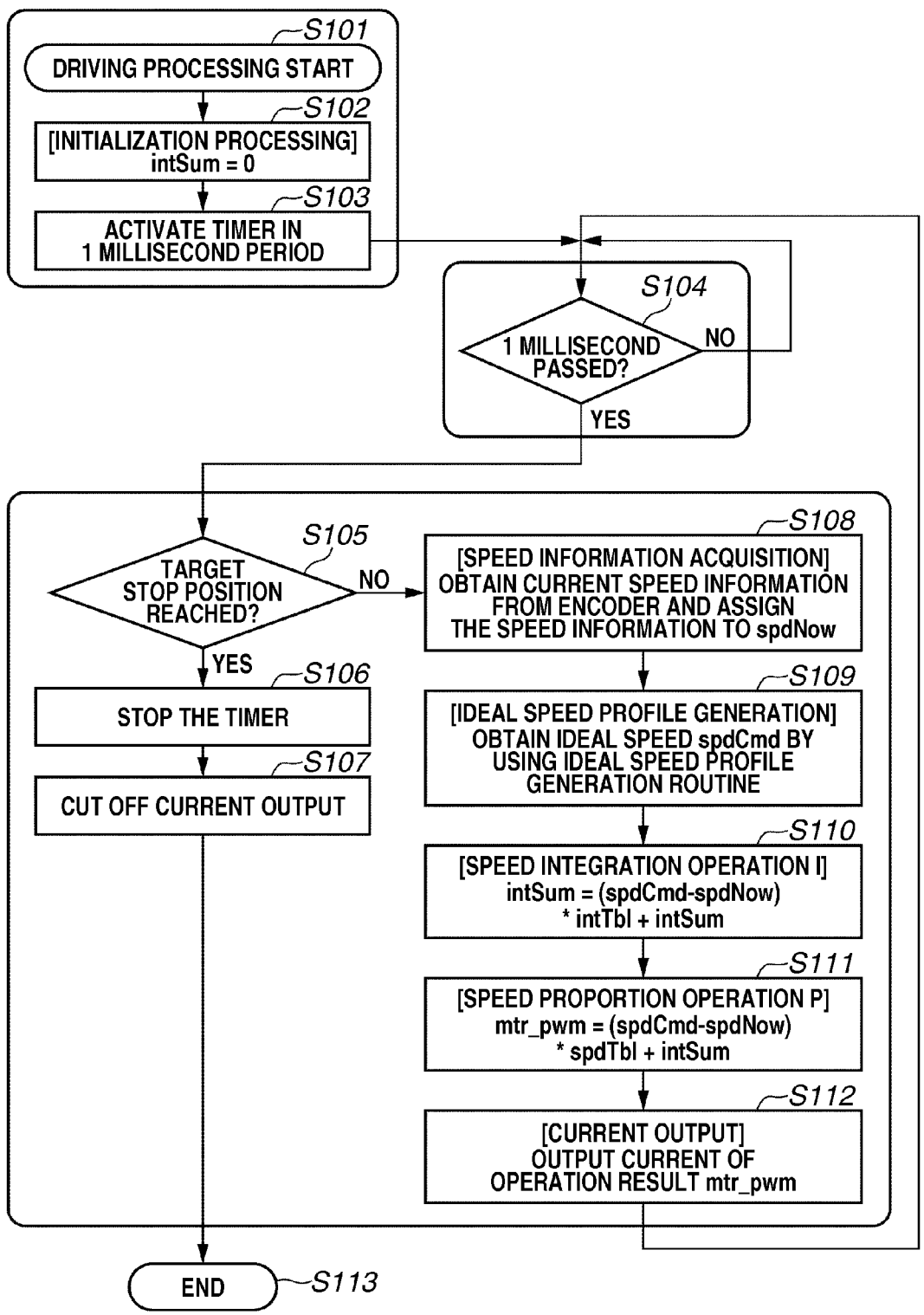
FIG. 4 is a flow chart illustrating feedback servo control of speed.

FIG. 4 is a flow chart illustrating feedback servo control of speed. This control is applied to driving of the DC motor 303, which is a driving source for the carriage 103. Steps S101 to S103 are processing belonging to a layer of an image reading control task in terms of software, and steps S104 to S113 are processing belonging to a layer of a timer handler.

In step S101, when driving processing of the DC motor 303 involved in image reading control is started, then in step S102, the CPU 301 initializes a variable intSum. The variable intSum indicates an integral compensation amount calculated by integral computation in feedback control. In step S103, the CPU 301 activates the timer handler (in one millisecond period in the image reading apparatus) that performs feedback control, which ends processing in the task layer. Hereinafter, the processing in step S105 and subsequent steps will be started every one millisecond in step S104 indicating timer processing. In step S105, the CPU 301 determines whether an object (the carriage 103) has reached a target stop position. If the CPU 301 determines that the object has reached the target stop position, the processing proceeds to step S106, in which the CPU 301 stops the timer. In step S107, the CPU 301 cuts off the current supply to the DC motor 303 before driving processing being terminated in step S113. If, on the other hand, the CPU 301 determines that the object has not reached the target stop position, the processing proceeds to step S108, in which the CPU 301 acquires speed information. More specifically, the CPU 301 obtains the current speed information from the encoder sensor 305 and assigns the speed information to a variable spdNow. Next, the processing proceeds to step S109, in which the CPU 301 acquires ideal speed information spdCmd at the time of processing from an ideal speed profile generation routine. The ideal speed profile can easily be determined by integrating a speed command profile thereof.

Calculations in the next steps S110 and S111 exemplify a known configuration in which feedback control, generally called proportional-integral-derivative (PID) control, is applied to speed control. In step S110, the CPU 301 performs processing to perform an integration operation for a speed servo. That is, the CPU 301 calculates a delay amount of speed by subtracting the current speed information spdNow from the speed command value spdCmd. The amount of delay is multiplied by spdTbl, which is a proportional gain coefficient of speed, and the result is added to the integral compensation amount intSum determined when an interrupt of the timer in one millisecond period occurred last time to obtain new intSum as an operation result of the integration term. In step S111, the CPU 301 performs processing to determine the current output value after performing a proportional operation for the speed servo. That is, the CPU 301 calculates the delay amount of speed by subtracting the current speed information spdNow from the speed command value spdCmd and the delay amount is multiplied by intTbl, which is an integration gain coefficient of speed. A current output value mtr_pwm is obtained by adding intSum, which is the operation result of the integration term, to the operation result of a proportional term obtained as described above.

Next, the processing proceeds to step S112, in which the CPU 301 supplies to the DC motor 303 a current corresponding to the magnitude of mtr_pwm determined as an operation result. Then, the processing returns to step S104, in which the CPU 301 performs processing of another task before one millisecond passes.

Figure 5:
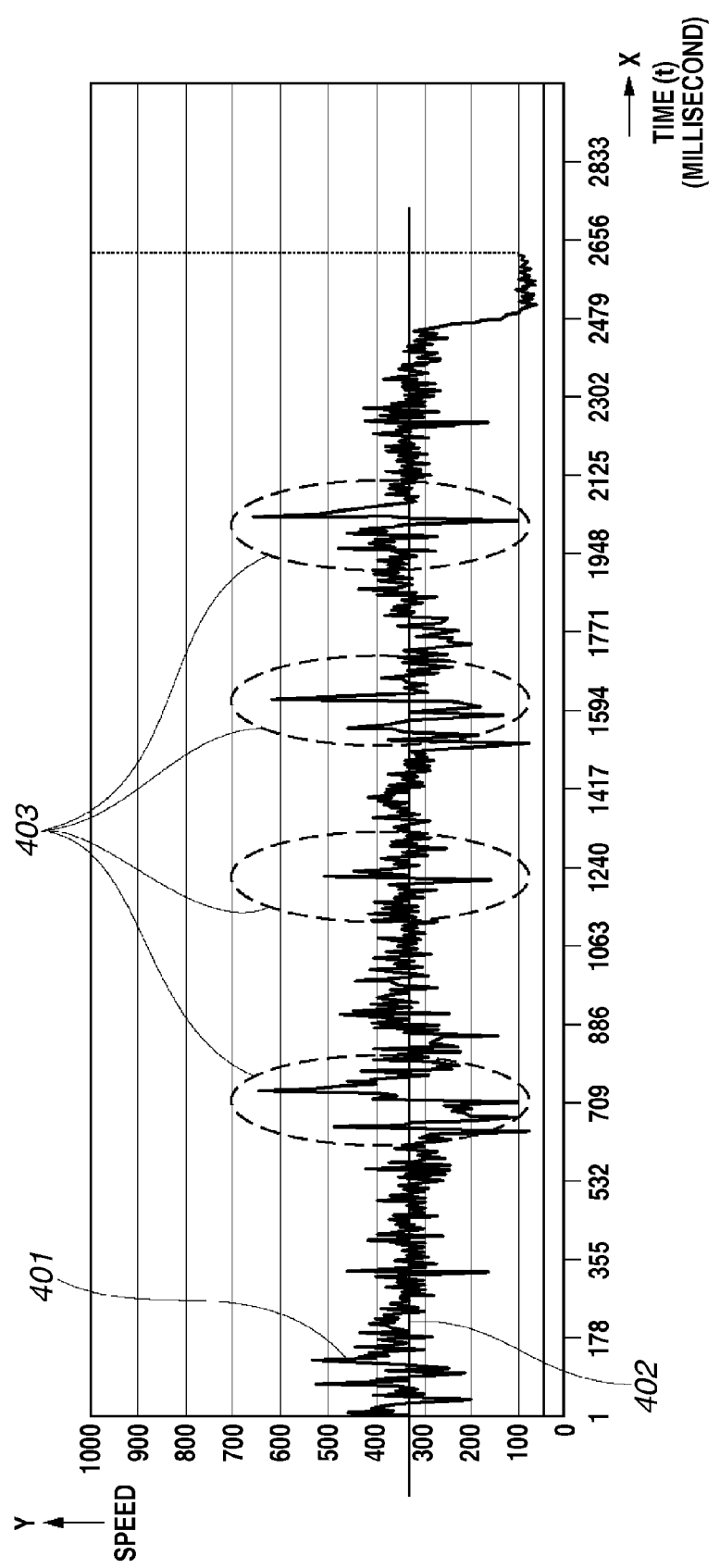
FIG. 5 is a diagram illustrating speed fluctuations when image reading processing in high resolution is performed by applying the feedback servo control illustrated in FIG. 4 for image reading with a carriage moving at a low speed.

FIG. 5 is a diagram illustrating speed fluctuations in the image reading apparatus 100 when image reading processing in high resolution is performed by applying the feedback servo control illustrated in FIG. 4 and moving the carriage 103 at a low speed. Image reading in high resolution here is reading, for example, at 9600 dpi. This is a definition in comparison with other resolutions such as 2400 dpi and 75 dpi. In FIG. 5, the X axis indicates an elapsed time during image reading and the Y axis indicates the speed. In the example illustrated in FIG. 5, the DC motor 303 is set so that the carriage 103 is moved at a constant speed of an ideal speed 402. An actual detected speed 401 faster than the ideal speed 402 means that the reading speed is faster than assumed. This indicates that the reading sensor 308 of the carriage 103 may not be on the reading line for a time necessary for reading, that is, to capture an image. In such a case, the reading sensor 308 cannot acquire normal image data of the reading line, causing image shifts. Similarly, the actual detected speed 401 slower than the ideal speed 402 means that the reading speed is slower than assumed. In such a case, the reading sensor 308 may be on the reading line longer than necessary for reading. In such a case, if the light source 306 for the reading sensor 308 continues to light up, an overflow of the value of read image data may occur due to overexposure, or if the light source 306 goes out at other than a time necessary for reading, noise may be generated by a dark current.

Such an issue rarely affects an image because a certain degree of design margin is provided. However, due to an influence of cogging of the carriage 103 or the like, for example, as indicated by portions 403 in FIG. 5, speed fluctuations that are too significant to ignore may arise at regular intervals.

Figure 6:
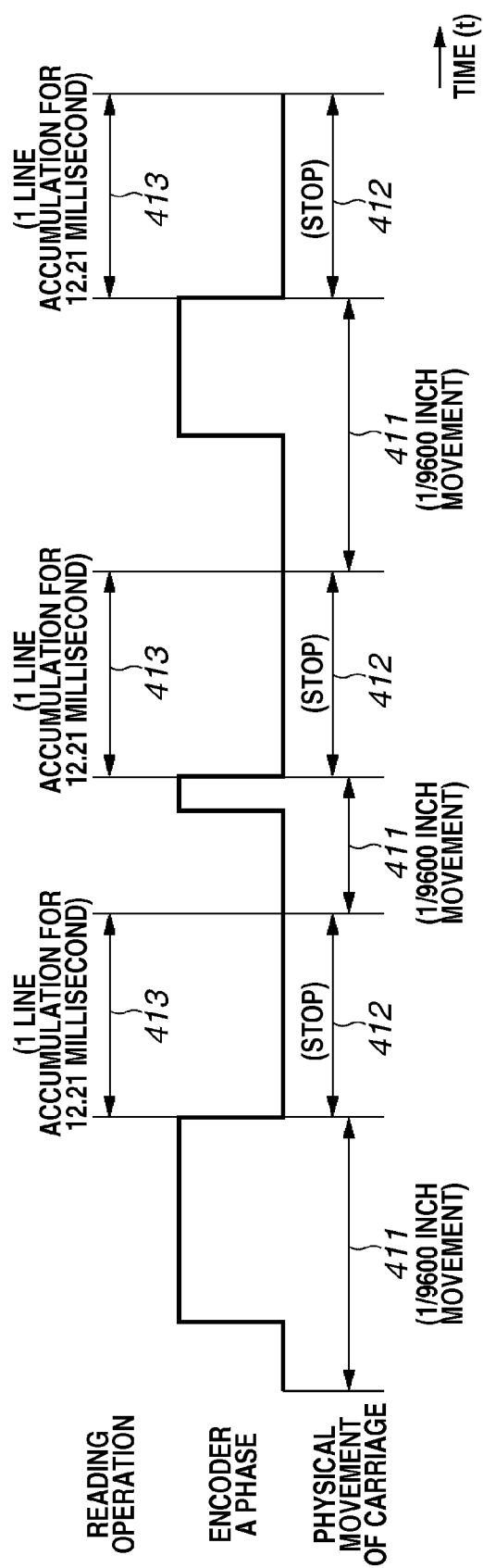
FIG. 6 is a diagram conceptually illustrating a solution when speed fluctuations that cannot be ignored for reading an image arise.

FIG. 6 is a diagram conceptually illustrating a control method to deal with speed fluctuations. Here, movement will be described with reference to a signal waveform of an A phase of the encoder. Speed fluctuations that cannot be ignored for image reading arise because the carriage 103 is moved at a constant low speed to attempt to read a high-resolution image. Thus, in the present exemplary embodiment, the carriage 103 is moved for each reading line and control is performed so that image reading processing is performed while the carriage 103 is stopped. Accordingly, the time necessary to read pixels to be read, that is, the time necessary for the reading sensor 308 to capture data of the reading line is ensured.

When, as illustrated in FIG. 6, an image in 9600 dpi resolution is read, the DC motor 303 is controlled to first move the carriage 103 by 1/9600 inch (411). This control is performed by using both edges (a rising edge and a falling edge) of the A phase and a B phase of the encoder. Then, the carriage 103 stops for a time (12.21 milliseconds) necessary for the reading sensor 308 to capture data for the reading line (412). In this period 412, image reading is performed (413). By repeating this cycle as many times as the number of reading lines instructed by the user, reading processing in high resolution can be realized while speed fluctuations of the DC motor 303 is avoided. Incidentally, such movement control is also performed even when the carriage 103 is moved at a low speed.

If movement control of the carriage 103 as illustrated in FIG. 6 is realized, a phenomenon in which the motor stops less precisely due to torque fluctuations mainly caused by the DC motor 303 occurs. That is, the carriage 103 moves after movement processing by servo control is completed so that a phenomenon (swing-back) in which the stop position of the carriage 103 shifts forward from the target stop position occurs.

Figure 7:
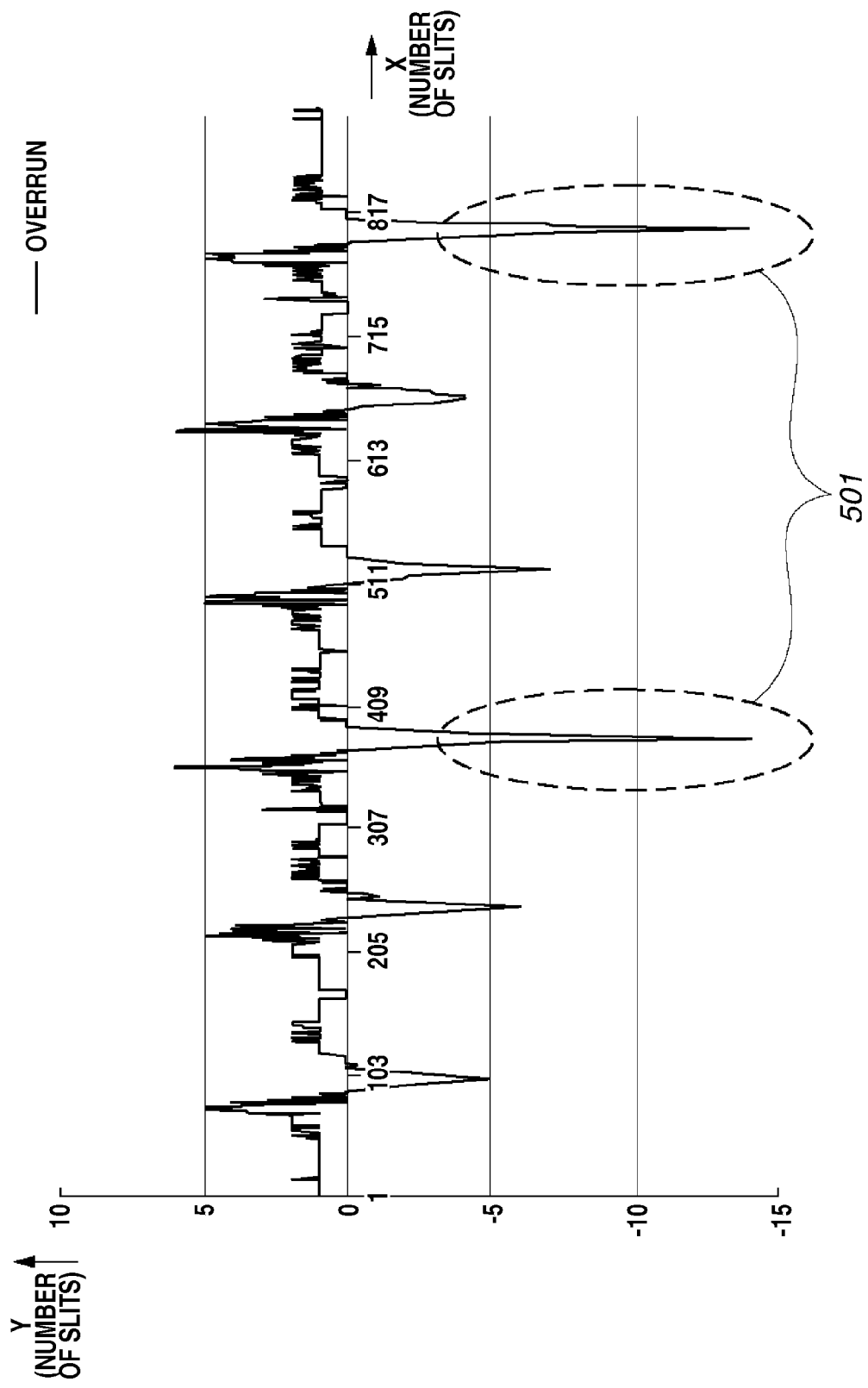
FIG. 7 is a diagram illustrating stop precision of a carriage.

FIG. 7 is a diagram illustrating stop precision of the carriage 103. In FIG. 7, the X axis indicates a rotation amount of the DC motor 303, which is indicated by the number of slits cut in the rotary encoder film for the DC motor 303. Thus, an increasing number thereof indicates a longer distance. The Y axis, on the other hand, indicates the overrun (overrun distance) with respect to the target stop position and is represented, like the X axis, in slits. On the Y axis, "0" indicates the target stop position, the plus direction indicates that the carriage 103 has moved too far, and the minus direction indicates that the carriage 103 has stopped before the target. Therefore, an increasing difference from "0" indicates that the carriage 103 has stopped farther away from the target stop position.

A certain degree of margin is normally provided in a design so that minor shifts can be tolerated (±5 slits in the present exemplary embodiment). However, as indicated by portions 501 in FIG. 7, when some time passes after stopping in a specific period, the carriage 103 stops before the target stop position, resulting in an extremely large amount (distance) of overrun. A correlation between the overrun and the rotation phase of the DC motor 303 is found. Thus, the overrun occurs periodically. Therefore, when an image is read in a specific phase, to put it another way, reading processing at a different place from the reading line that should be read may be performed at regular intervals. This causes pixel shifts, leading to quality degradation of output images.

In view of the above circumstances, drive control of the DC motor 303 described below is performed in the present exemplary embodiment. First, the DC motor 303 is preliminarily driven for one rotation. At this point, control is performed so that each time the speed servo for one reading line is performed, the carriage 103 is stopped and current output to the DC motor 303 after the carriage 103 being stopped is made to be "0" to determine the overrun distance for each phase when a predetermined time passes after the carriage 103 being stopped. Then, like the carriage 103 being moved and stopped repeatedly, the current output value after the carriage 103 being stopped when the DC motor 303 is driven is calculated from the overrun distance for each phase and specific coefficients. Further, an overrun is prevented and the precision with which the carriage 103 is stopped is guaranteed by reflecting the calculated currents in the drive control of the DC motor 303 when the carriage 103 is stopped.

Figure 8A:
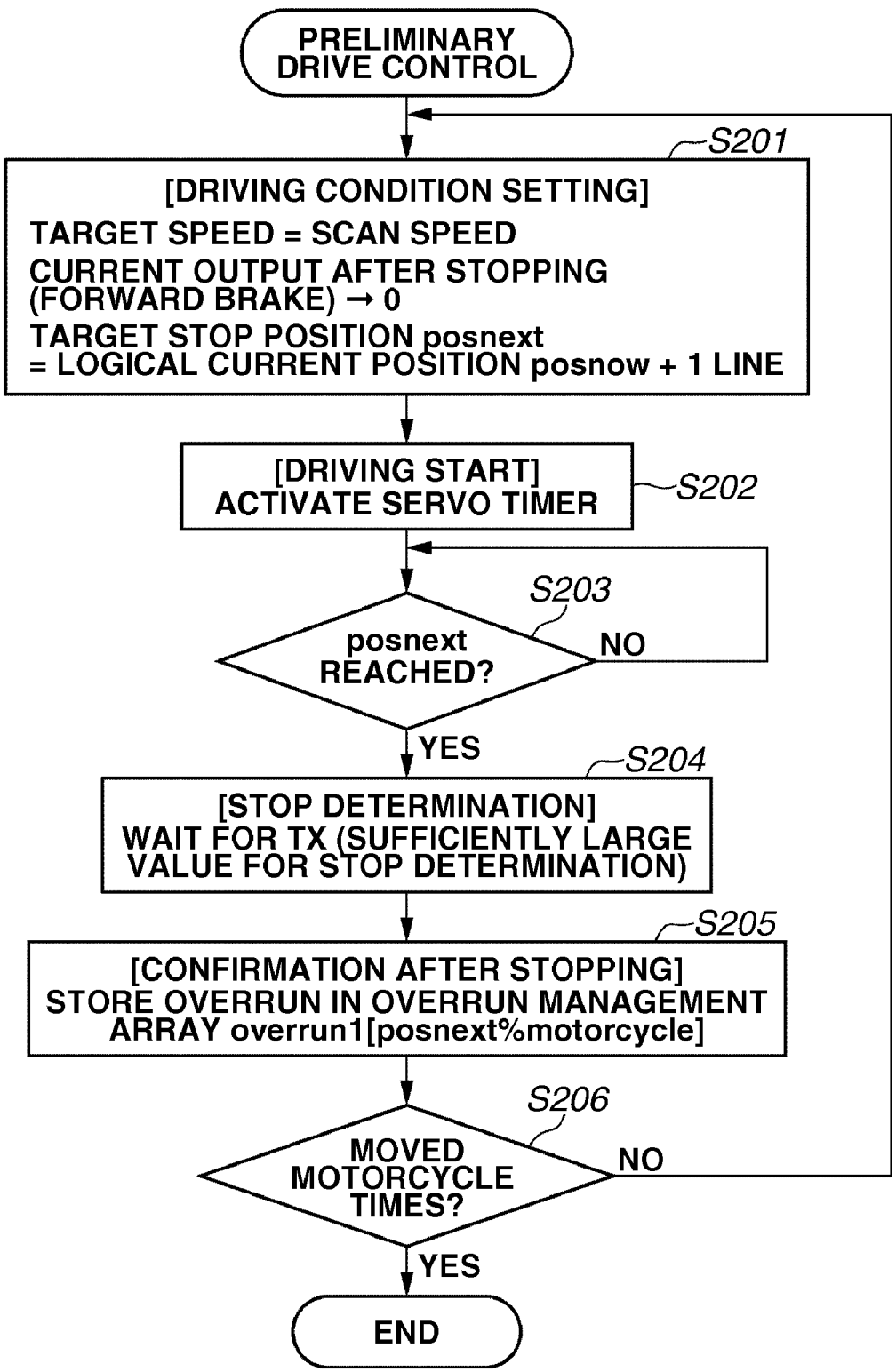
FIGS. 8A and 8B are flow charts illustrating drive control of a DC motor.
Figure 8B:
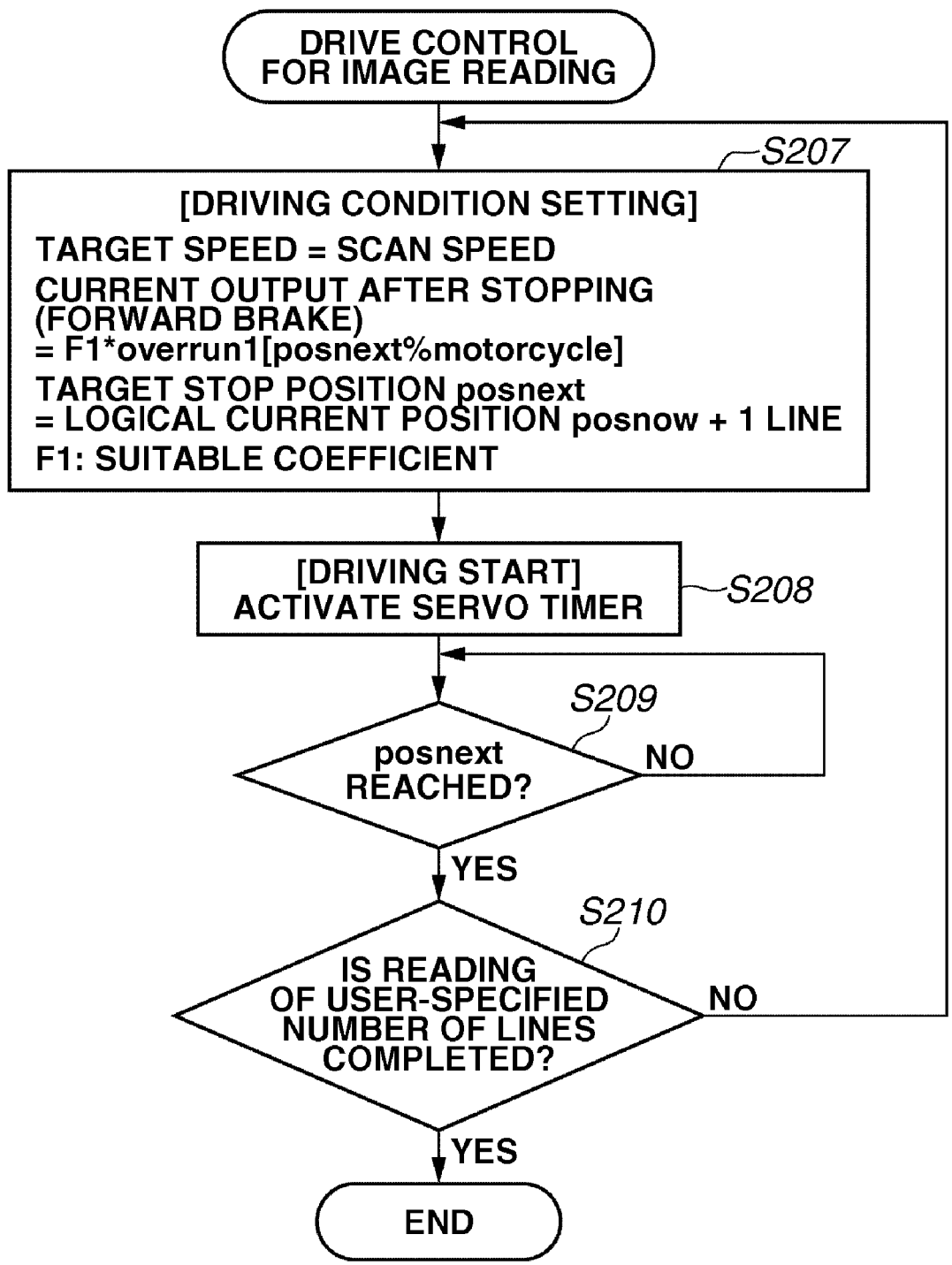

FIGS. 8A and 8B are flow charts illustrating drive control of the DC motor 303. FIG. 8A illustrates preliminary drive control and FIG. 8B drive control for reading an image. When the CPU 301 performs reading processing of an image in high resolution, the CPU 301 reads an optimal carriage traveling speed for performing reading processing of an image in high resolution stored in the ROM 311 or the RAM 301. The CPU 301 sets the speed to the motor driver 302. Then, the motor driver 302 performs preliminary driving processing of the DC motor 303 for one rotation.

First, preliminary drive control will be described with reference to FIG. 8A. The motor driver 302 is set by the CPU 301. In step S201, the CPU 301 sets the carriage traveling speed set to the target speed, current output after the carriage 103 being stopped to "0", and the target stop position (posnext) to "logical current position (posnow)+one reading line". That is, the CPU 301 sets the target stop position (posnext) to a value obtained by adding a value for one line. After the settings, in step S202, the CPU 301 starts driving of the DC motor 303 and activates the servo timer. Details of the servo control operation are as described with reference to FIG. 4. In step S203, the CPU 301 determines whether the carriage 103 has reached the target stop position (posnext). This determination is conducted every one millisecond. If the CPU 301 determines that the carriage 103 has reached the target stop position, the CPU 301 stops the current supply to the DC motor 303, and the processing then proceeds to step S204. In step S204, the CPU 301 waits to perform processing for a time (Tx) that is sufficient for stop determination to reliably stop the carriage 103. After the stop, in step S205, the CPU 301 measures the overrun distance of the DC motor 303 for each phase and stores measurement results thereof in the RAM 310 while associating them with the phase of the DC motor 303 being stopped. At this point, under specific conditions, data of the overrun distance associated with the phase of the DC motor 303 necessary for reading processing (hereinafter, image reading) after the preliminary drive control operation is completed may not be available with the distance set in step S201. The specific conditions depend on the determined read resolution or hardware specifications of the DC motor 303. In such a case, the CPU 301 repeats processing of steps S201 to S205 until overruns for all phases are measured. Thus, in step S206, the CPU 301 checks whether the repetition count thereof has reached a threshold.

When the preliminary driving operation is started, how many times (motorcycle in step S206) to repeat processing of steps S201 to S205 may be calculated in advance. Similarly, the repetition count (motorcycle) may be stored in the ROM 311 or the RAM 310 in advance.

After overruns for all phases of the DC motor 303 necessary for image reading are measured and stored, the CPU 301 terminates the preliminary drive control operation. All phases of the DC motor 303 necessary for image reading refer to phases that stop the DC motor 303 (perform reading processing) in image reading processing in 9600 dpi. After the preliminary driving, image reading in 9600 dpi is started.

Next, the drive control of the DC motor 303 when an image is read will be described with reference to FIG. 8B. First, in step S207, the CPU 301 sets a current amount to the motor driver 302. The current amount is a result of multiplication of the overrun (overrun 1) stored after being measured by the preliminary drive control operation and a constant F1. The constant F1 is a value determined by hardware specifications of the DC motor 303 or the like and is a fixed value. When the overrun distance is "0", the current value supplied to the DC motor 303 while the carriage 103 is stopped will be "0".

Further, the CPU 301 sets the carriage traveling speed to the target speed and "result of multiplication of the overrun distance by the constant F1" to the current output after the carriage 103 being stopped to the motor driver 302. Further, the CPU 301 sets the target stop position (posnext) to "logical current position (posnow)+one reading line". That is, processing to add one line for the target stop position (posnext) at a time is performed. The reason for setting "result of multiplication of the overrun by the constant F1" to the current output after the carriage 103 being stopped is that it becomes necessary to supply a larger current to the DC motor 303 to prevent an overrun with an increasing overrun. The carriage traveling speed does not change from the preliminary drive control operation and thus, the phase of the DC motor 303 while the carriage 103 being stopped will be the same phase. Therefore, there is no need to newly acquire the overrun measured in the preliminary drive control operation.

After such settings, in step S208, the CPU 301 starts driving of the DC motor 303 and activates the servo timer. In step S209, the CPU 301 determines whether the carriage 103 has reached the target stop position (posnext). This determination is conducted every one millisecond. If the CPU 301 determines that the carriage 103 has reached the target stop position, the CPU 301 stops the current supply to the DC motor 303 and performs image reading (for one reading line) of a document. A current is supplied so that, with the start of the reading, a rotational force in the forward direction is provided to the DC motor 303 (hereinafter, a forward brake). The current value at this point is a current value as a result of preliminary driving ("result of multiplication of the overrun by the constant F1" associated with the phase of the DC motor 303). Thus, a larger current is supplied with an increasing overrun. Then, the processing proceeds to step S210. In step S210, after one reading line being read, the CPU 301 determines whether as many lines as the number of lines determined by the user have been read. If the CPU 301 determines that as many lines as determined have been read, the CPU 301 terminates the processing. Otherwise, the processing returns to step S207 and the CPU 301 performs reading processing of the next line.

Figure 9:
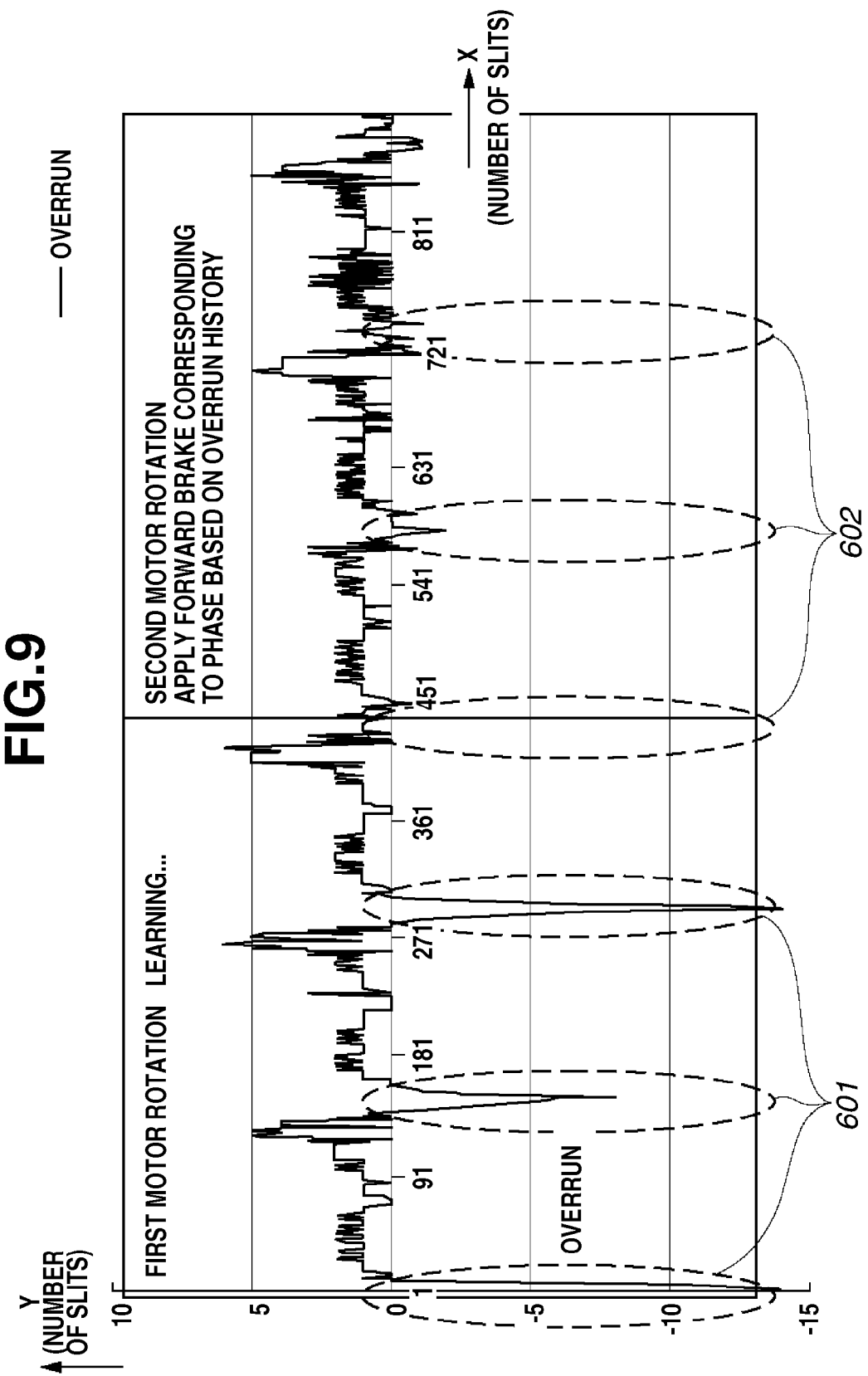
FIG. 9 is a diagram illustrating results of measuring the stop precision of the DC motor when the control illustrated in FIGS. 8A and 8B is performed.

FIG. 9 is a diagram illustrating results of measuring the stop precision of the DC motor 303 when the control illustrated in FIGS. 8A and 8B is performed. In FIG. 9, meanings of the X axis and the Y axis are the same as those described with reference to FIG. 7 and thus, a description thereof will not be repeated. In the present exemplary embodiment, the first rotation of the DC motor 303 is defined as a learning period to measure the overrun. This is executed by the preliminary drive control operation (steps S201 to S206) illustrated in FIG. 8A. Then, resultant learning content is reflected in the second-rotation and subsequent operations (drive control operations (steps S207 to S210) of image reading illustrated in FIG. 8B) of the DC motor 303. Accordingly, an occurrence of an overrun with an extremely large shift as indicated by portions 501 in FIG. 7 can be prevented in the second rotation of the DC motor 303 or thereafter when image reading processing is performed.

More specifically, in the first rotation of the DC motor 303, a phase in which an overrun as indicated by portions 601 in FIG. 9 occurred is measured to learn in which phase an overrun occurs. Then, as indicated by portions 602 in FIG. 9, a forward brake is applied with a current value that does not cause swing-back in such a phase in the second rotation or thereafter of the DC motor 303. By performing such control, the carriage 103 can reliably be stopped at the determined position (target stop position).

Therefore, according to the above exemplary embodiment, the speed servo for one reading line is also performed when a document image is read in high resolution so that the carriage can be stopped with guaranteed precision and one reading line can be read with an optimal time ensured for reading. Accordingly, even an apparatus including an encoder that does not have sufficient resolution for low-speed driving of a DC motor to read a document image in high resolution can read an image in high resolution with high precision.

Moreover, even an apparatus including an encoder that does not have sufficient resolution (that is, an inexpensive encoder) can read an image in high resolution with high precision and, therefore, a contribution to lower prices of image reading apparatuses is made.

An image reading apparatus has been described as an apparatus in an exemplary embodiment of the present invention. However, the apparatus according to the embodiment of the present invention is not limited to the image reading apparatus and other apparatuses may also be used. As another exemplary embodiment, the present invention may be applied to a printer driving a carriage including a recording unit 317 or a printer including a motor and a conveyance unit 316 to convey sheets (FIG. 3).

In the above exemplary embodiment, the driving amount of preliminary driving processing is assumed to be one rotation, but the present invention is not limited to this, and the driving amount of preliminary driving processing may be set to two rotations.

The preliminary driving processing is to be performed before a reading operation in predetermined resolution and the preliminary driving processing may be omitted when a reading operation in other resolutions is performed. In other resolutions, control is performed to perform image reading by moving the carriage at a predetermined constant speed, instead of driving and stopping for each line.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-182891 filed Aug. 5, 2009, which is hereby incorporated by reference herein in its entirety.

What is claimed is:

1. An apparatus including a DC motor, the apparatus comprising:
   a driven member including a unit which performs an operation in a predetermined resolution and configured to be driven by the DC motor; and
   a drive control unit configured to define a plurality of predetermined phases of the DC motor as target stop phases and to cause the DC motor to make at least one rotation to perform preliminary driving that rotates the DC motor to each target stop phase by driving and stopping the DC motor, configured to acquire a difference value between the target stop phase and an actual stop phase for each target stop phase, and configured to drive the DC motor so that the driven member is repeatedly moved and stopped in the predetermined resolution and to perform control so that, based on the acquired difference value, electric power is supplied to the DC motor in a phase corresponding to a stop position of the driven
   wherein an interval of the target stop phases corresponds to the predetermined resolution.

2. The apparatus according to claim 1, further comprising a detection unit configured to detect the phase of the DC motor.

3. The apparatus according to claim 1, wherein the drive control unit sets a current value according to the difference value.

4. The apparatus according to claim 1, wherein the unit includes a reading sensor, and the interval of the target stop phases corresponds to a read resolution of a reading operation of the reading sensor.

5. The apparatus according to claim 1, wherein the unit includes a recording head, and the interval of the target stop phases corresponds to a recording resolution of a recording operation of the recording head.

6. The apparatus according to claim 1, wherein the unit includes a conveyance unit, and the interval of the target stop phases corresponds to a conveyance resolution of the conveyance unit.

7. A driving method for a DC motor configured to drive a driven member, the driving method comprising:
   defining a plurality of predetermined phases of the DC motor as target stop phases and causing the DC motor to make at least one rotation before an operation of the driven member to perform preliminary driving that rotates the DC motor to each target stop phase by driving and stopping the DC motor;
   acquiring a difference value between the target stop phase and an actual stop phase for each target stop phase; and
   driving the DC motor so that the driven member is repeatedly moved and stopped in a predetermined resolution and performing control so that, based on the acquired difference value, electric power is supplied to the DC motor in a phase corresponding to a stop position of the driven member,
   wherein the driven member includes a unit which performs the operation in the predetermined resolution, and an interval of the target stop phases corresponds to the predetermined resolution.

* * * * *